(12) United States Patent
Haraguchi et al.

(10) Patent No.: US 11,584,606 B2
(45) Date of Patent: Feb. 21, 2023

(54) SHEET PROCESSING DEVICE, SHEET LAMINATOR, IMAGE FORMING APPARATUS, AND IMAGE FORMING SYSTEM

(71) Applicant: Ricoh Company, Ltd., Tokyo (JP)

(72) Inventors: Yohsuke Haraguchi, Kanagawa (JP); Tomohiro Furuhashi, Kanagawa (JP); Yoshito Suzuki, Chiba (JP); Shinya Monma, Kanagawa (JP); Wataru Takahashi, Tokyo (JP); Joji Akiyama, Kanagawa (JP); Sho Asano, Kanagawa (JP); Wataru Nozaki, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/357,482

(22) Filed: Jun. 24, 2021

(65) Prior Publication Data
US 2021/0403273 A1     Dec. 30, 2021

(30) Foreign Application Priority Data

Jun. 29, 2020    (JP) .............................. JP2020-111421

(51) Int. Cl.
    *B65H 37/04*         (2006.01)
    *B65H 7/02*          (2006.01)
    *B65H 3/32*          (2006.01)
    *B32B 37/14*         (2006.01)
    (Continued)

(52) U.S. Cl.
CPC ........... *B65H 37/04* (2013.01); *B32B 37/142* (2013.01); *B32B 37/187* (2013.01); *B65H 3/32* (2013.01); *B65H 3/443* (2013.01); *B65H 7/02* (2013.01); *B65H 2557/64* (2013.01); *B65H 2701/1131* (2013.01)

(58) Field of Classification Search
CPC ...... B65H 29/125; B65H 45/04; B65H 45/16; B25H 3/06; B25H 3/36
See application file for complete search history.

(56) References Cited

U.S. PATENT DOCUMENTS

| 5,217,561 A * | 6/1993 | Ueda ................... B32B 38/0036 |
| | | 219/508 |
| 6,893,521 B2 * | 5/2005 | Sasaki ................... B32B 37/185 |
| | | 156/367 |

(Continued)

FOREIGN PATENT DOCUMENTS

| JP | 9-150456 | 6/1997 |
| JP | 9-164593 | 6/1997 |
| JP | 2006-160429 | 6/2006 |

*Primary Examiner* — Francisco W Tschen
*Assistant Examiner* — Abhishek A Patwardhan
(74) *Attorney, Agent, or Firm* — Xsensus LLP

(57) ABSTRACT

A sheet processing device separates a two-ply sheet in which two sheets are overlapped and partially bonded and sandwich a sheet medium between the two sheets. The sheet processing device includes a relay conveyance path, a sheet loader, and control circuitry. The sheet medium is fed from an image forming apparatus connected upstream of the sheet processing device through the relay conveyance path. The sheet loader loads at least one of the two-ply sheet and the sheet medium. The control circuitry performs a mixing mode to feed the two-ply sheet or the sheet medium from the sheet loader.

17 Claims, 16 Drawing Sheets

(51) Int. Cl.
*B32B 37/00* (2006.01)
*B65H 3/44* (2006.01)

(56) References Cited

U.S. PATENT DOCUMENTS

| | | | |
|---|---|---|---|
| 7,946,326 B2* | 5/2011 | Lee | B65H 5/305 |
| | | | 156/367 |
| 11,053,090 B1* | 7/2021 | Noviello | H04N 1/00039 |
| 2005/0079968 A1* | 4/2005 | Trovinger | B65H 45/142 |
| | | | 493/356 |
| 2016/0257100 A1* | 9/2016 | Tachibana | B32B 37/0053 |
| 2017/0021603 A1* | 1/2017 | Kikuchi | B32B 37/182 |
| 2018/0257900 A1 | 9/2018 | Suzuki et al. | |
| 2019/0010011 A1 | 1/2019 | Watanabe et al. | |
| 2019/0276263 A1 | 9/2019 | Hidaka et al. | |
| 2019/0284008 A1 | 9/2019 | Sakano et al. | |
| 2019/0284009 A1 | 9/2019 | Suzuki et al. | |
| 2019/0284010 A1 | 9/2019 | Asami et al. | |
| 2019/0284011 A1 | 9/2019 | Furuhashi et al. | |
| 2019/0284012 A1 | 9/2019 | Yoneyama et al. | |
| 2019/0367317 A1 | 12/2019 | Haraguchi et al. | |
| 2020/0140222 A1 | 5/2020 | Takahashi et al. | |
| 2020/0239265 A1 | 7/2020 | Suzuki et al. | |
| 2020/0247107 A1 | 8/2020 | Morinaga et al. | |
| 2020/0247636 A1 | 8/2020 | Furuhashi et al. | |
| 2020/0270093 A1 | 8/2020 | Suzuki et al. | |
| 2020/0338877 A1 | 10/2020 | Takahashi et al. | |
| 2020/0341414 A1 | 10/2020 | Watanabe et al. | |
| 2020/0385231 A1 | 12/2020 | Kunieda et al. | |
| 2020/0407187 A1 | 12/2020 | Hidaka et al. | |
| 2021/0039900 A1 | 2/2021 | Shimazu et al. | |
| 2021/0039916 A1 | 2/2021 | Sugiyama et al. | |

\* cited by examiner

# SHEET PROCESSING DEVICE, SHEET LAMINATOR, IMAGE FORMING APPARATUS, AND IMAGE FORMING SYSTEM

CROSS-REFERENCE TO RELATED APPLICATION

This patent application is based on and claims priority pursuant to 35 U.S.C. § 119(a) to Japanese Patent Application No. 2020-111421, filed on Jun. 29, 2020, in the Japan Patent Office, the entire disclosure of which is hereby incorporated by reference herein.

BACKGROUND

Technical Field

This disclosure relates to a sheet processing device, a sheet laminator, an image forming apparatus, and an image forming system.

Related Art

There is known a lamination technology of inserting an inner sheet (e.g., paper or photo) between a two-ply lamination sheet or lamination film (e.g., a lamination pouch or lamination folder) and applying heat and pressure to the two-ply lamination sheet to bond the two-ply lamination sheet. The two-ply sheet is made of two sheets (plies) bonded (sealed) on one side as if one sheet is folded.

For example, a sheet laminator is known that separates a lamination film with the leading ends of two sheets bonded together, by a separation and release device (upper and lower vacuum devices), and then inserts a protected paper sheet between the two sheets of the lamination film.

In addition, an image forming apparatus is known that controls operations of a fixing device based on the thickness of a lamination sheet to perform desired sheet lamination on the lamination sheet.

SUMMARY

In an aspect of the present disclosure, there is provided a sheet processing device that separates a two-ply sheet in which two sheets are overlapped and partially bonded and sandwich a sheet medium between the two sheets. The sheet processing device includes a relay conveyance path, a sheet loader, and control circuitry. The sheet medium is fed from an image forming apparatus connected upstream of the sheet processing device through the relay conveyance path. The sheet loader loads at least one of the two-ply sheet and the sheet medium. The control circuitry performs a mixing mode to feed the two-ply sheet or the sheet medium from the sheet loader.

BRIEF DESCRIPTION OF THE DRAWINGS

The aforementioned and other aspects, features, and advantages of the present disclosure would be better understood by reference to the following detailed description when considered in connection with the accompanying drawings, wherein.

Figure 1:
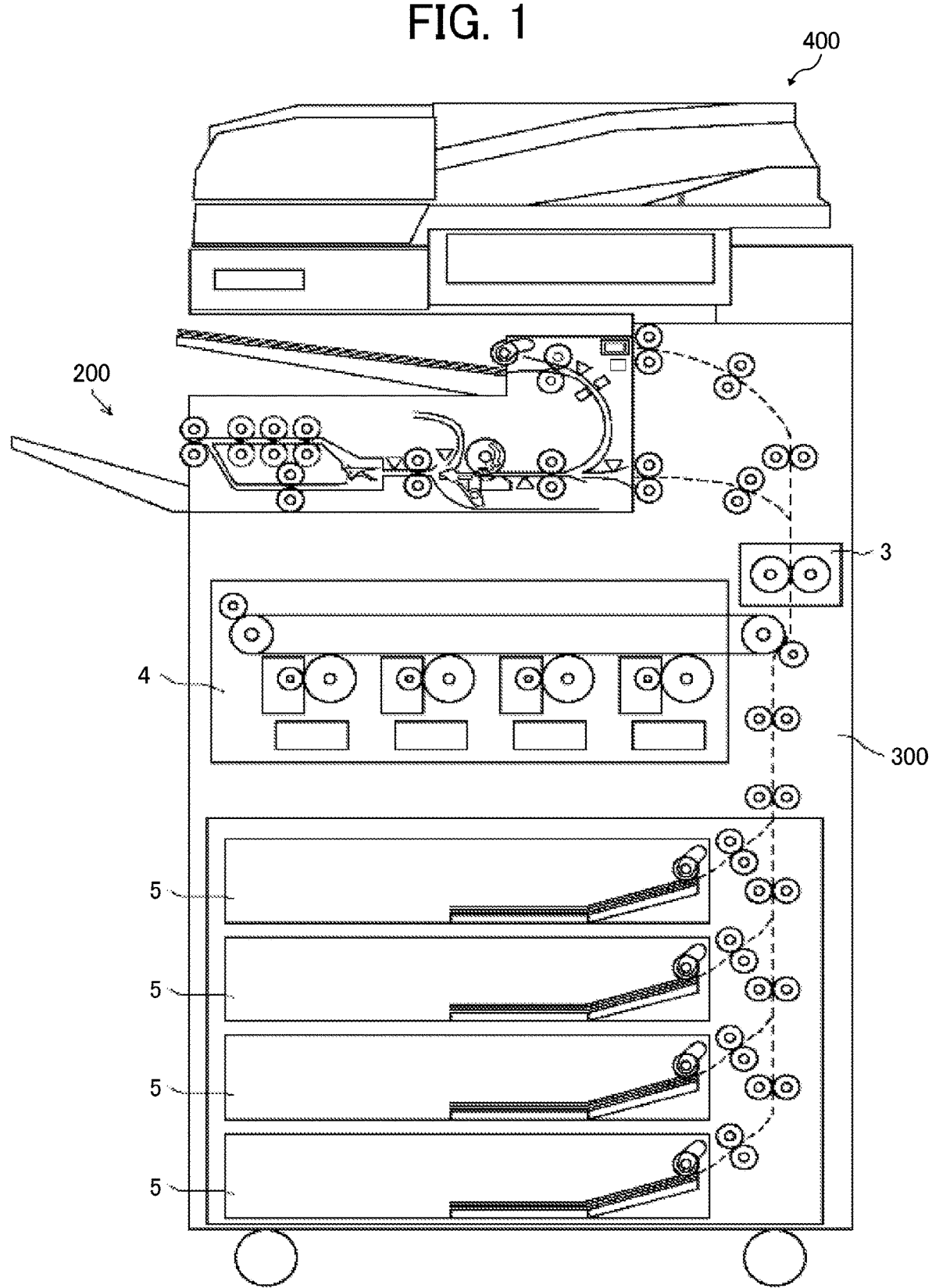
FIG. 1 is a schematic diagram illustrating an overall configuration of an image forming system according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

FIG. 1 is a schematic diagram illustrating an overall configuration of an image forming system according to an embodiment of the present disclosure. An image forming system 400 according to the present embodiment includes a sheet laminator 200 inside a body of an image forming apparatus 300.

The image forming apparatus 300 mainly includes a plurality of feeding units 5 that load and convey recording media, an image forming unit 4 as an image forming device that forms an image on a recording medium, and a heat fixing unit 3 that fixes the formed image on the recording medium.

In the image forming system 400, an inner sheet to be inserted into a lamination sheet can be fed from the image forming apparatus 300 or from a sheet feed tray of the sheet laminator 200. Accordingly, a desired image can be inserted in an in-line manner by a method utilizing copying or printing onto the inner sheet.

Figure 2:
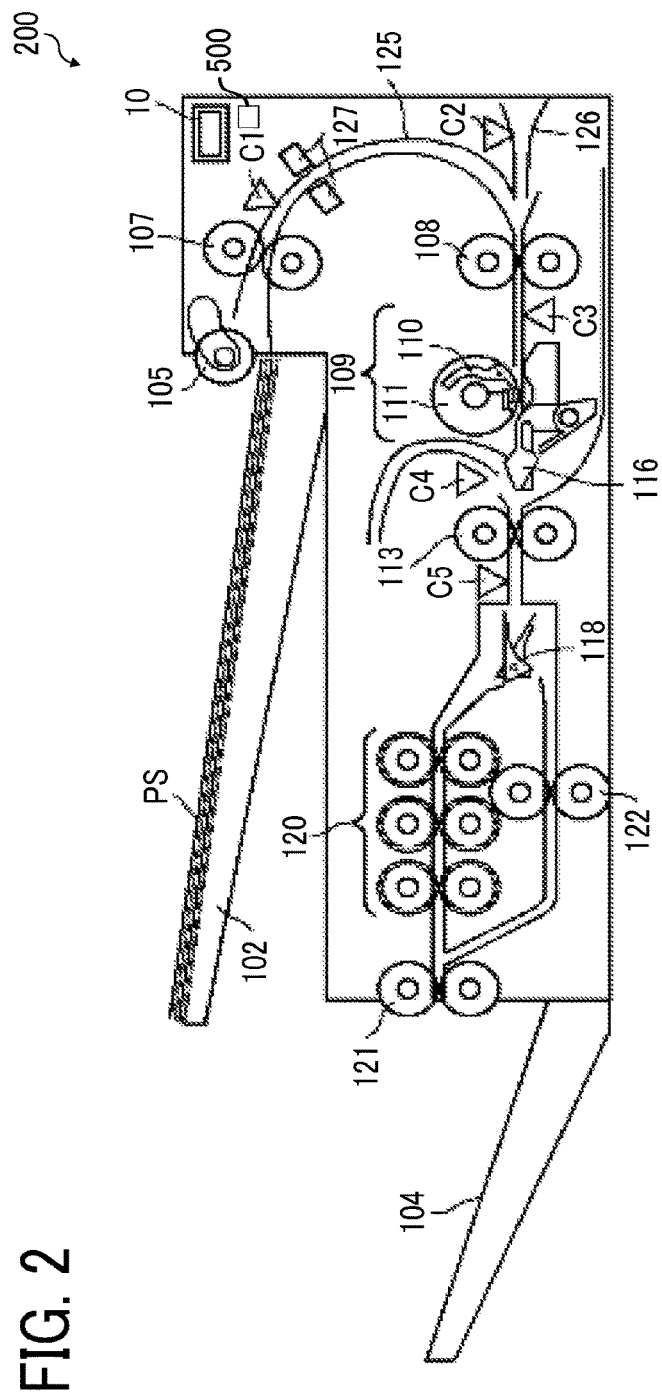
FIG. 2 is a schematic view illustrating an overall configuration of a sheet laminator according to an embodiment of the present disclosure.

FIG. 2 is a schematic view illustrating an overall configuration of a sheet laminator according to an embodiment of the present disclosure. The sheet laminator 200 according to the present embodiment is to separate a two-ply sheet (hereinafter referred to as a lamination sheet S) from each other, insert and sandwich a sheet medium (hereinafter referred to as an inner sheet P) into and between separated pieces of the lamination sheet S, and applies heat and pressure to the lamination sheet S to bond the lamination sheet S.

The lamination sheet S is a two-ply sheet in which two sheets are overlapped and bonded together at a portion (or a side) of the two-ply sheet. For example, there is a two-ply sheet in which a first side is a transparent sheet such as a transparent polyester sheet and the opposite side is a transparent or opaque sheet and bonded to the other sheet on one side of the two-ply sheet. Examples of the two-ply sheet also include a lamination film.

The inner sheet P is an example of the sheet medium that is inserted into the two-ply sheet. Examples of the sheet medium include thick paper, postcards, envelopes, plain paper, thin paper, coated paper, art paper, tracing paper, and overhead projector (OHP) transparencies.

As illustrated in FIG. 2, the sheet laminator 200 includes a sheet tray 102 serving as a sheet loader to stack lamination sheets S and/or inner sheets P, a pickup roller 105 to feed the lamination sheets S and/or the inner sheets P from the sheet tray 102, and a conveyance roller pair 107.

The sheet laminator 200 includes, for example, an entrance roller pair 108 serving as a first conveyor, a winding roller 109 serving as a rotating member, an exit roller pair 113 serving as a second conveyor. The entrance roller pair 108, the winding roller 109, and the exit roller pair 113 are disposed downstream of the conveyance roller pair 107 in a sheet conveyance direction. The sheet laminator 200 includes a conveyance path 125 and a relay conveyance path 126. The conveyance path 125 extends from the sheet tray 102 toward the entrance roller pair 108. The inner sheet P fed from the image forming apparatus 300 is conveyed through the relay conveyance path 126.

The downstream side from the exit roller pair 113 in the sheet conveyance direction is separated into the upper side and the lower side by a separation claw 118. The upper side includes heat pressing rollers 120 that are thermal pressing members to heat and press a lamination sheet S, and the lower side includes a conveyance roller pair 122. An ejection roller 121 and an ejection tray 104 are disposed downstream from the heat pressing rollers 120 and the conveyance roller pair 122.

The sheet laminator 200 further includes separation claws 116 between the winding roller 109 and the exit roller pair 113. The separation claws 116 are movable in the width direction of the lamination sheet S. Note that the entrance roller pair 108, the exit roller pair 113, the winding roller 109, and the separation claws 116 are some examples of a separation mechanism that separates the lamination sheet S. The pickup roller 105, the conveyance roller pair 107, the entrance roller pair 108, and the winding roller 109 are some examples of a first feeder.

A conveyance sensor C1 that detects the conveyance position of the lamination sheet S is disposed downstream from the conveyance roller pair 107 in the conveyance direction. A conveyance sensor C3 that detects the conveyance positions of the lamination sheet S and the inner sheet P is disposed downstream from the entrance roller pair 108 in the conveyance direction. An abnormal condition detection sensor C4 that detects the condition of the lamination sheet S is disposed downstream from the winding roller 109 in the conveyance direction. A conveyance sensor C5 that detects the conveyance position of the lamination sheet S is disposed downstream from the exit roller pair 113 in the conveyance direction. The relay conveyance path 126 is also provided with a conveyance sensor C2 that detects the conveyance position of the lamination sheet S and the inner sheet P.

The conveyance sensors C1 to C5 also serve as sheet detectors that detects whether the lamination sheet S and/or the inner sheet P is in the conveyance path. The conveyance sensors C1 to C5 are implemented by sensors such as optical sensors and ultrasonic sensors.

The sheet laminator 200 includes determination sensors 127 serving as a sheet determination device that determines the type of a conveyed sheet on the conveyance path 125. Details of the determination sensors 127 is described later.

An operation panel 10 (so-called operation panel) and a power ON/OFF button are disposed on an exterior of the sheet laminator 200. The operation panel 10 (so-called operation panel) is a notification device that displays information of a laminator main unit and inputs a processing instruction to the laminator main unit.

The operation panel 10 also serves as a notification device that issues a perception signal to the user. The operation panel 10 may notify such a signal with, e.g., a liquid crystal panel or a liquid emitting diode (LED). For example, a buzzer may be separately provided as the notification device to perform notification by sound.

Instead of the operation panel 10, for example, a switch or a button may be disposed to input a processing instruction.

Figure 3:
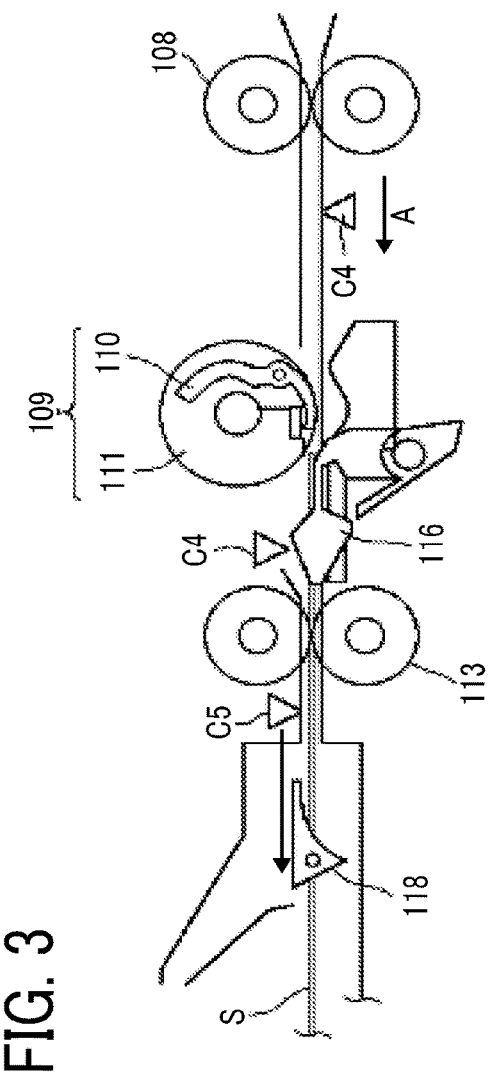
FIG. 3 is a configuration diagram illustrating a main part of the sheet laminator illustrated in FIG. 2.

FIG. 3 is a configuration diagram illustrating a main part of the sheet laminator illustrated in FIG. 2. As illustrated in FIG. 3, each of the entrance roller pair 108 and the exit roller pair 113 is formed of, for example, two rollers paired with each other and driven by a driver such as a motor. A controller 500 causes the driver to control rotations of the entrance roller pair 108 and the exit roller pair 113. The entrance roller pair 108 rotates in one direction. The exit roller pair 113 rotates in forward and reverse directions, thereby nipping and conveying the lamination sheet S and the inner sheet P.

The entrance roller pair 108 conveys the lamination sheet S and the inner sheet P toward the exit roller pair 113. The sheet conveyance direction indicated by arrow A in FIG. 3 is hereinafter referred to as a "forward conveyance direction" or a sheet conveyance direction A.

The exit roller pair 113 is capable of switching the direction of rotation between the forward direction and the reverse direction. The exit roller pair 113 conveys the lamination sheet S nipped by the rollers of the exit roller pair 113 toward the ejection tray 104 (see FIG. 2) in the forward conveyance direction and also conveys the lamination sheet S toward the winding roller 109 in the direction opposite the forward conveyance direction (to convey the lamination sheet S in reverse). The sheet conveyance direction of the lamination sheet S toward the winding roller 109 (that is, the direction opposite the forward conveyance direction) indicated by arrow B in FIG. 3 is hereinafter referred to as a reverse conveyance direction or a sheet conveyance direction B.

The sheet laminator 200 is provided with the winding roller 109 as a rotator and the separation claws 116 that are disposed between the entrance roller pair 108 and the exit roller pair 113. The winding roller 109 is driven by a driver such as a motor to rotate in the forward and reverse directions. The direction of rotation of the winding roller 109 is switchable between the forward direction (clockwise direction) and the reverse direction (counterclockwise direction). The controller 500 causes the driver to control rotations of the winding roller 109 and operations of the separation claws 116.

The winding roller 109 includes a roller 111 and a sheet gripper 110 movably disposed on the roller 111 to grip the lamination sheet S. The sheet gripper 110 that is movable grips the leading end of the lamination sheet S together with the roller 111. The sheet gripper 110 may be formed on the outer circumference of the roller 111 as a single unit or may be formed as a separate unit. The controller 500 causes a driver to move the sheet gripper 110.

Next, the separating operation of the lamination sheet S of the sheet laminator 200 is described with reference to FIGS. 1 to 9. In FIGS. 3 to 9, elements identical to those illustrated in FIG. 1 or 2 are given identical reference numerals, and the descriptions thereof are omitted.

In FIG. 2, the lamination sheets S is loaded on the sheet tray 102 such that a part of the bonded side of the lamination sheet S is located downstream from the pickup roller 105 in the sheet feed direction (sheet conveyance direction). In the sheet laminator 200, the pickup roller 105 picks up the lamination sheet S from the sheet tray 102, and the conveyance roller pair 107 conveys the lamination sheet S toward the entrance roller pair 108.

Next, as illustrated in FIG. 3, the entrance roller pair 108 conveys the lamination sheet S toward the winding roller 109. In the sheet laminator 200, the entrance roller pair 108 conveys the lamination sheet S with the bonded end, which is one of four sides of the lamination sheet S, as the downstream side in the forward conveyance direction A as indicated by arrow A in FIG. 2.

The sheet laminator 200 temporarily stops conveyance of the lamination sheet S when the trailing end of the lamination sheet S in the forward conveyance direction has passed the winding roller 109. Note that these operations are performed by conveying the lamination sheet S from the sheet sensor C3 by a specified amount in response to the timing at which the sheet sensor C3 detected the leading end of the lamination sheet S.

Figure 4:
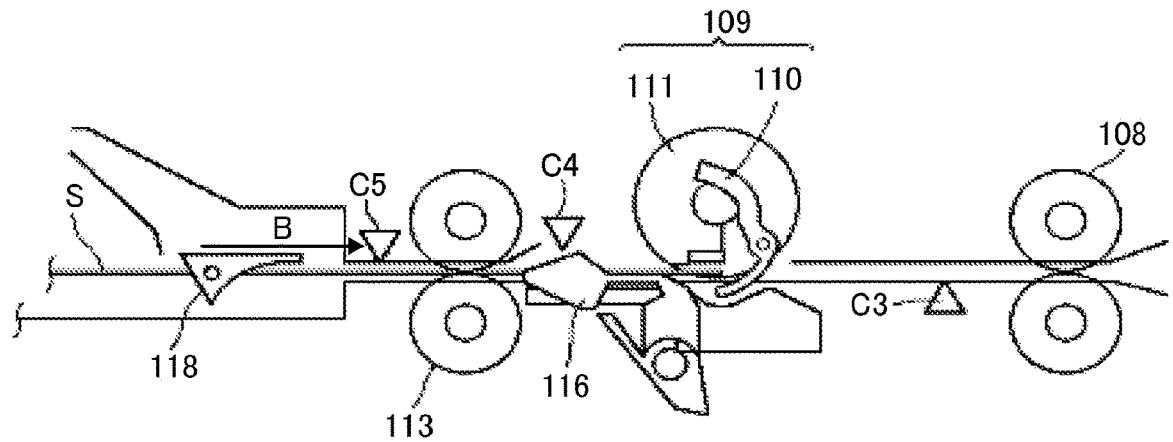
FIG. 4 is a schematic view illustrating the main part of the sheet processing device in a state subsequent to the state in FIG. 3.

Next, as illustrated in FIG. 4, the controller 500 of the sheet laminator 200 causes the sheet gripper 110 to open and the exit roller pair 113 to rotate in the reverse direction to convey the lamination sheet S in the reverse conveyance direction (sheet conveyance direction B) toward the opened portion of the sheet gripper 110.

Figure 5:
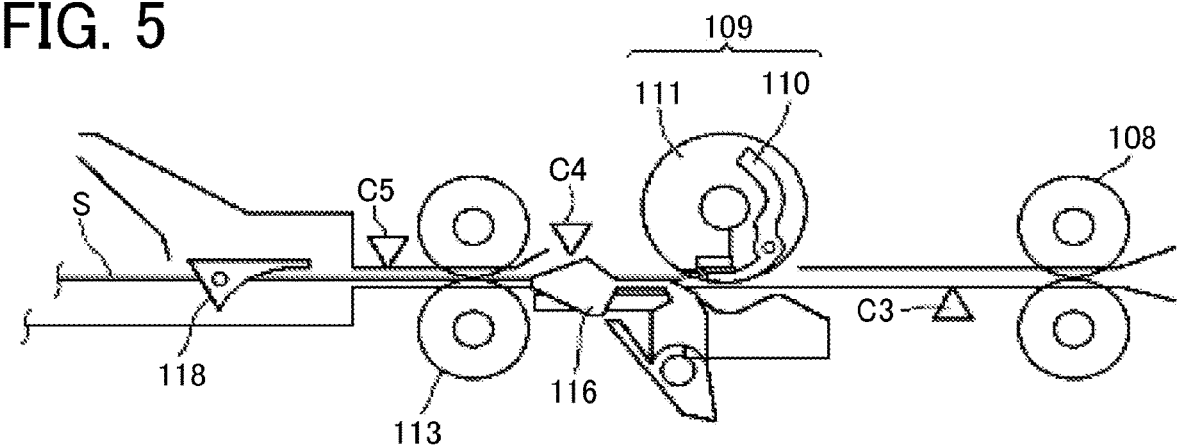
FIG. 5 is a schematic view illustrating the main part of the sheet processing device in a state subsequent to the state in FIG. 4.

Subsequently, as illustrated in FIG. 5, the controller 500 of the sheet laminator 200 causes the exit roller pair 113 to stop rotating to stop conveyance of the lamination sheet S when the end of the lamination sheet S is inserted into the opened portion of the sheet gripper 110 and causes the driver to close the sheet gripper 110 to grip the end of the lamination sheet S. Note that these operations are performed when the lamination sheet S is conveyed by the specified amount.

Figure 6:
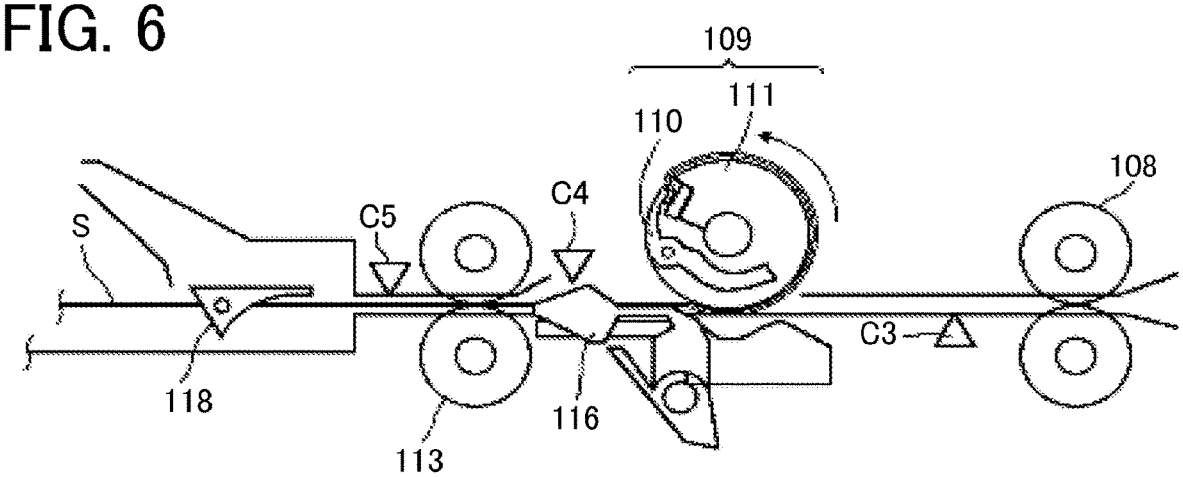
FIG. 6 is a schematic view illustrating the main part of the sheet processing device in a state subsequent to the state in FIG. 5.

Then, as illustrated in FIG. 6, the controller 500 of the sheet laminator 200 causes the driver to rotate the winding roller 109 in the counterclockwise direction in FIG. 6 to wind the lamination sheet S around the winding roller 109. Here, the lamination sheet S is wound around the winding roller 109 from the side where the two sheets of the lamination sheet S are overlapped but not bonded.

Figure 7A:
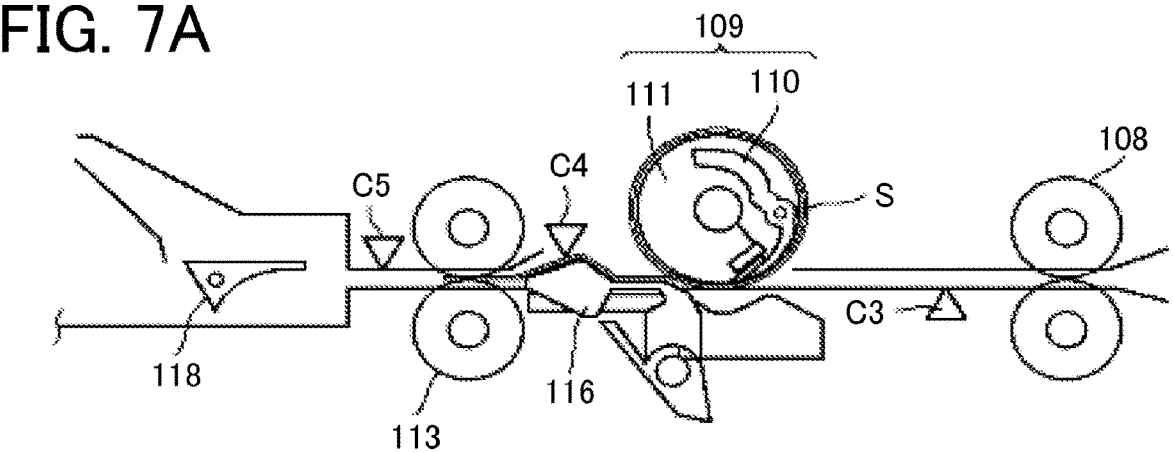
FIG. 7A is a schematic view illustrating the main part of the sheet processing device in a state subsequent to the state in FIG. 6.
Figure 7B:
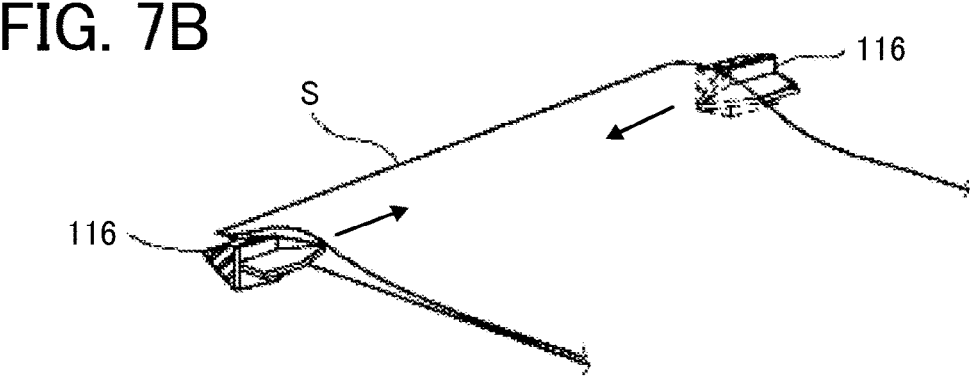
FIG. 7B is a perspective view of separation claws inserted into a space generated in a lamination sheet.

As illustrated in FIG. 7A, when the lamination sheet S that is the two-ply sheet is wound around the winding roller 109, a winding circumferential length difference is created between the two sheets in the amount of winding of the lamination sheet S around the circumference of the winding roller 109. There is a surplus of the sheet on the inner circumferential side to the center of the winding roller 109, which generates a slack toward the bonded end. As a result, a space is created between the two sheets constructing the two-ply sheet. As illustrated in FIG. 7B, as the separation claws 116 are inserted into the space generated as described above, from both sides of the lamination sheet S, the space between the two sheets is reliably maintained. Note that these operations are performed by conveying the lamination sheet S from the sheet sensor C5 by a specified amount in response to the timing at which the sheet sensor C5 detected the leading end of the lamination sheet S.

Figure 8A:
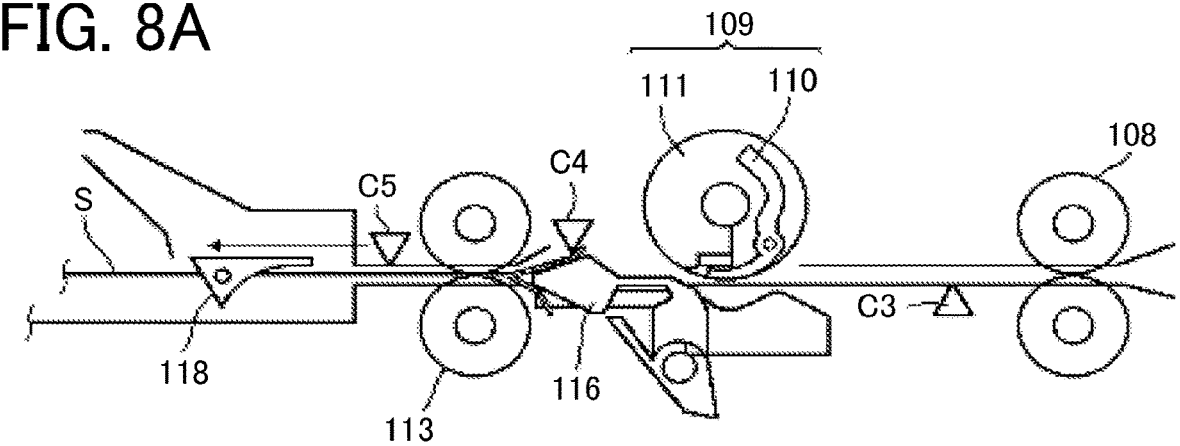
FIG. 8A is a schematic view illustrating the main part of the sheet processing device in a state subsequent to the state in FIG. 7A.
Figure 8B:
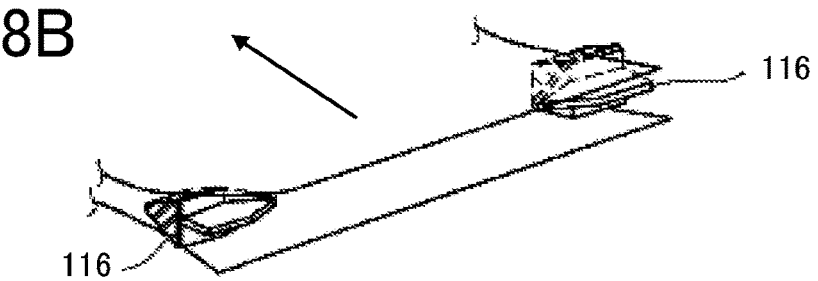
FIG. 8B is a perspective view of a lamination sheet whose trailing end is separated with separation claws.

In the sheet laminator 200, the winding roller 109 is rotated clockwise in a state where the separation claws 116 are inserted into the space formed in the lamination sheet S (see FIG. 7B). As illustrated in FIG. 8A, the controller 500 causes the space generated in the lamination sheet S to shift to the trailing end of the lamination sheet S in the forward conveyance direction (sheet conveyance direction A). After the winding roller 109 has been rotated by a specified amount, the controller 500 causes the driver to open the sheet gripper 110. As a result, the trailing end of the lamination sheet S is separated into the upper and lower sheets (see FIG. 8B).

In this state, the controller 500 of the sheet laminator 200 causes the driver to temporarily stop the conveyance of the lamination sheet S and to further move the separation claws 116 in the width direction of the lamination sheet S to separate the whole area of the trailing end of the lamination sheet S. Note that these operations are performed by conveying the lamination sheet S from the sheet sensor C5 by a specified amount in response to the timing at which the sheet sensor C5 detected the leading end of the lamination sheet S.

Figure 9:
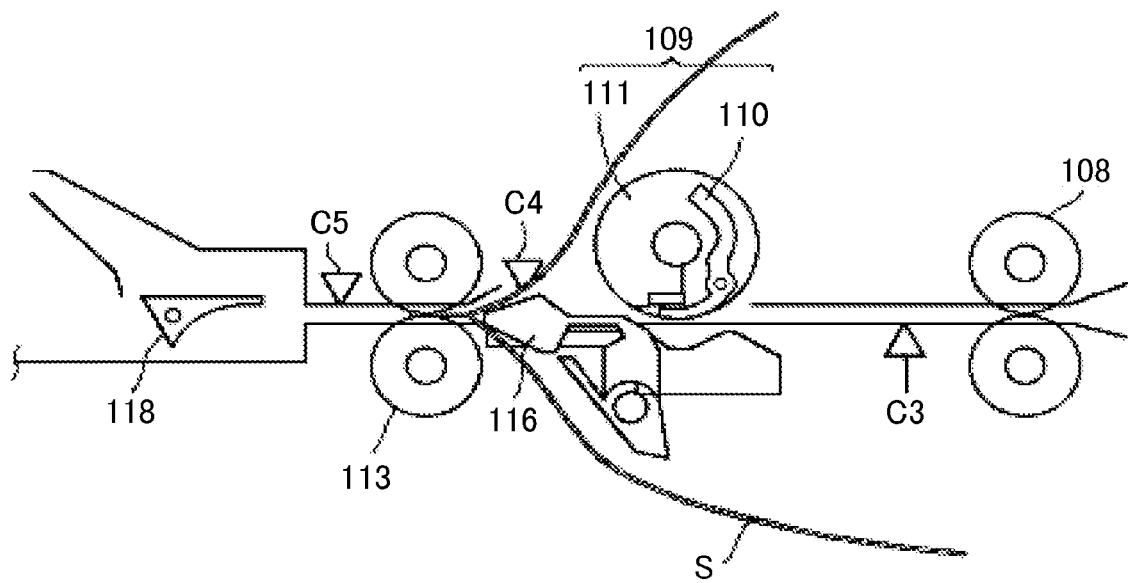
FIG. 9 is a schematic view illustrating the main part of the sheet processing device in a state subsequent to the state in FIG. 8A.

As illustrated in FIG. 9, after the separation claws 116 have separated the whole area of the trailing end of the lamination sheet S, the controller 500 causes the driver to rotate the exit roller pair 113 in the counterclockwise direction in FIG. 9 to convey the lamination sheet S in the reverse conveyance direction (sheet conveyance direction B). In other words, the separation claws 116 guide the two sheets separated from the lamination sheet S in the upper and lower directions, respectively, and thus the two sheets are fully separated.

The controller 500 of the sheet laminator 200 causes the driver to temporarily stop the conveyance of the lamination sheet S, so that the bonded portion of the lamination sheet S is held (nipped) by the exit roller pair 113. Accordingly, one end of the lamination sheet S is bonded as the bonded side of the lamination sheet S and the other end of the lamination sheet S is opened largely.

Note that these operations are performed by conveying the lamination sheet S from the sheet sensor C5 by a specified amount in response to the timing at which the sheet sensor C5 detected the leading end of the lamination sheet S. A series of operations starting from the conveyance of the lamination sheet S up to this point is referred to as "separation operation".

A description is given below of a configuration of a sheet laminator according to an embodiment of the present disclosure.

A first embodiment is described below. A sheet laminator 200 according to the present embodiment is capable of loading at least one of a two-ply sheet (lamination sheet S) and a sheet medium (inner sheet P) on a sheet tray 102, and has a "mixing mode" in which the lamination sheet S or the inner sheet P is fed one by one.

In other words, when the mixing mode is executed, not only the lamination sheet S but also the inner sheet P can be fed from the sheet tray 102. Accordingly, as the inner sheet P, not only a sheet (medium) printed by an image forming apparatus 300 but also a sheet (medium) loaded on the sheet tray 102 can be used.

When the mixing mode is executed, it is necessary to determine which of the lamination sheet S and the inner sheet P is fed from the sheet tray 102. For this reason, as illustrated in FIG. 2, the sheet laminator 200 according to the present embodiment includes the determination sensors 127 that determine the type of the conveyed sheet on the conveyance path 125.

Figure 10A:
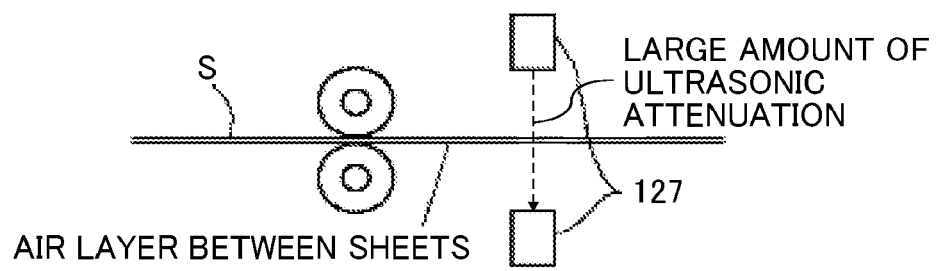
FIGS. 10A and 10B are schematic diagrams illustrating a configuration of determination sensors according to an embodiment of the present disclosure.
Figure 10B:
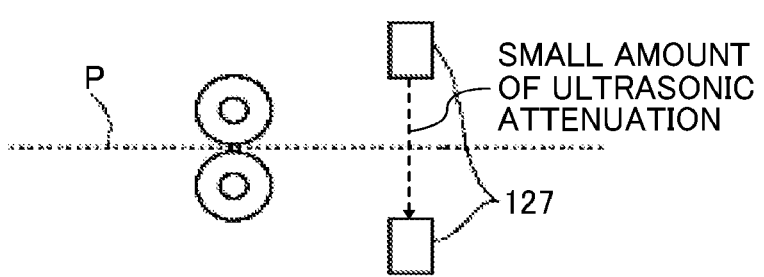

FIG. 10 is a schematic diagram illustrating the configuration of the determination sensor according to an embodiment of the present disclosure. The determination sensors 127 serving as a sheet determination device is a pair of ultrasonic sensors, one of which includes an ultrasonic wave transmitter and the other of which includes an ultrasonic wave receiver.

The type of a sheet (a two-ply sheet or a sheet medium) can be determined by the reduction amount of the ultrasonic wave when the sheet passes between the determination sensors 127. For example, (a) when a two-ply sheet (lamination sheet S) passes, the reduction amount of the ultrasonic wave is relatively large since an air layer exists between separated sheets of the two-ply sheet. By contrast, (b) when the inner sheet P passes, the reduction amount of the ultrasonic wave is relatively small since the inner sheet P is one sheet. Accordingly, the type of the sheet conveyed from the sheet tray 102 can be determined using the determination sensors 127.

In the sheet laminator 200 according to the present embodiment, the controller 500 changes the lamination processing (sheet processing) according to the determination result of the determination sensors 127.

Next, the sheet processing (lamination processing) in performing the mixing mode is described in detail.

Example 1

Figure 11:
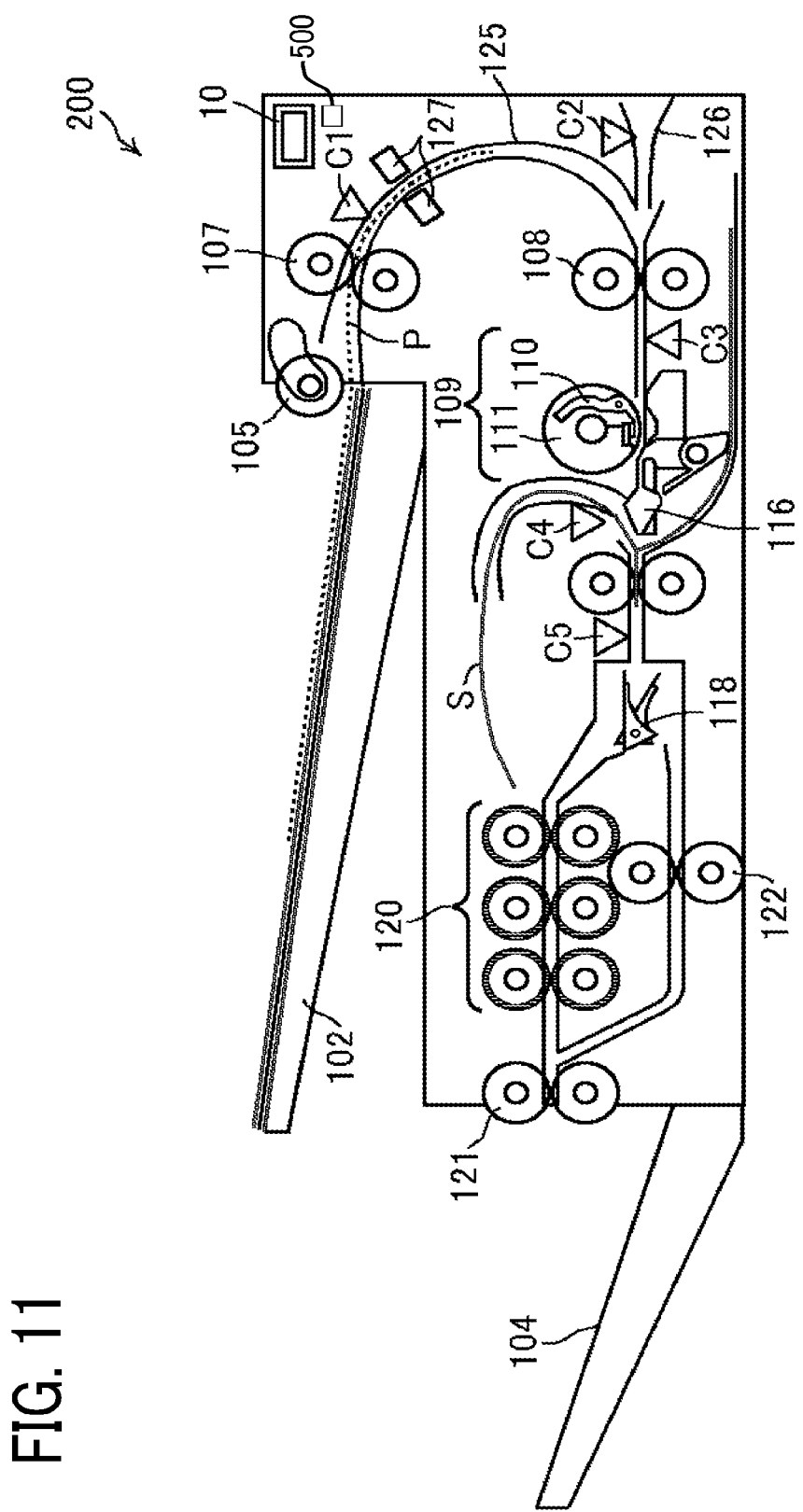
FIG. 11 is a schematic view of a sheet laminator that executes a mixing mode in a state in which a lamination sheet already separated is present in the sheet laminator.

FIG. 11 is a schematic view of the sheet laminator 200 that executes the mixing mode in a state in which a lamination sheet S already separated is present in the sheet laminator 200. Lamination sheets S and inner sheets P are loaded on the sheet tray 102, and the sheet detectors (conveyance sensors C1 to C5) detect a lamination sheet S already separated on the conveyance path of a laminator body.

Here, it is assumed that an inner sheet P is fed newly (as a first sheet) from the sheet tray 102 when the mixing mode is executed. In such a case, the sheet laminator 200 determines the sheet type as a sheet medium by the determination sensors 127 and inserts the inner sheet P into the already separated portions of the lamination sheet S.

Figure 12:
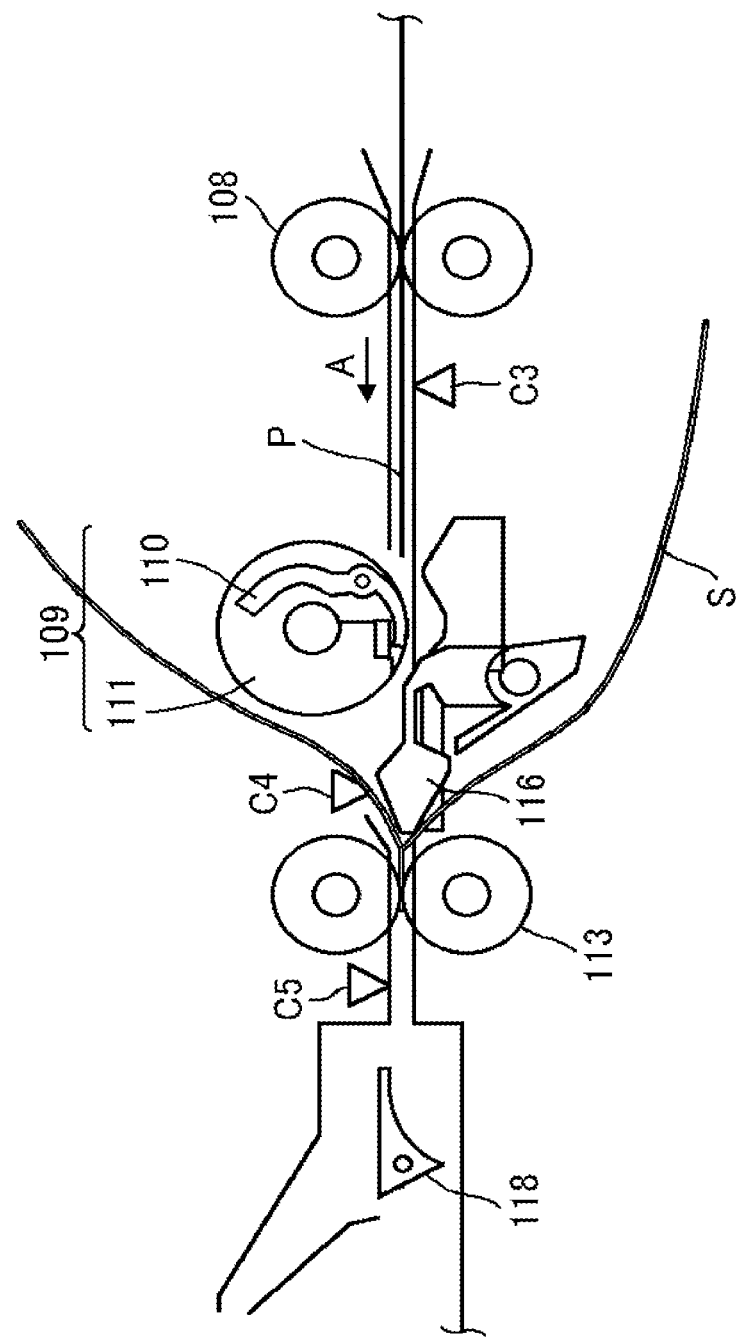
FIG. 12 is a schematic view illustrating the main part of the sheet processing device in a state subsequent to the state in FIG. 9.

For example, as illustrated in FIG. 12, the sheet laminator 200 rotates the entrance roller pair 108 to convey the inner sheet P conveyed from the sheet tray 102 (see FIG. 11) toward the exit roller pair 113 in the forward conveying direction (sheet conveyance direction A).

Figure 13:
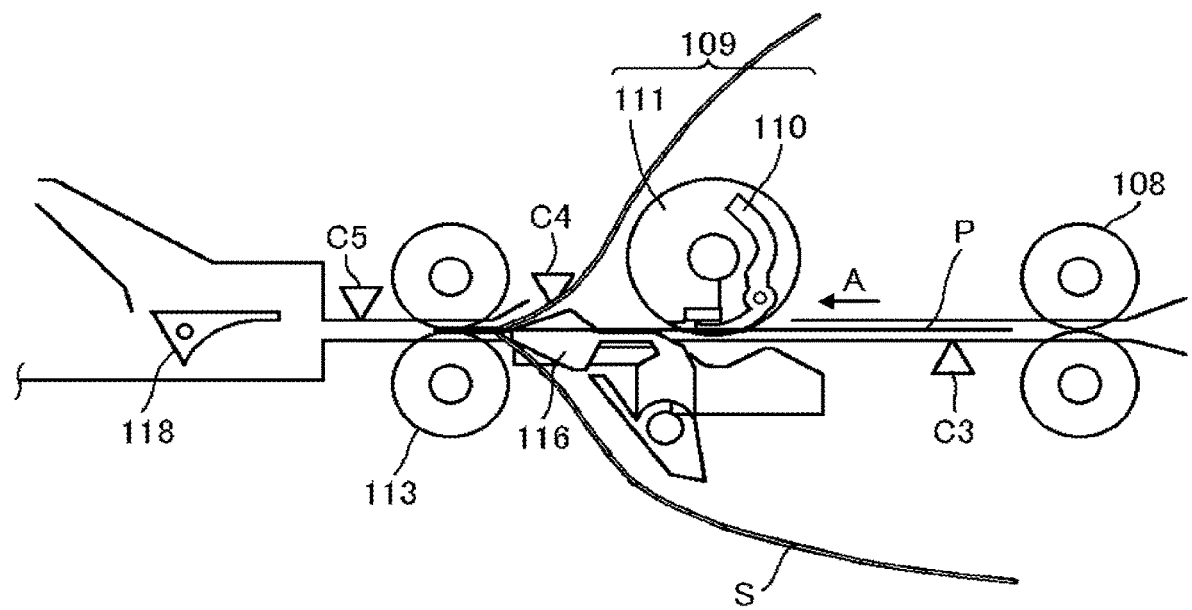
FIG. 13 is a schematic view illustrating the main part of the sheet processing device in a state subsequent to the state in FIG. 12.
Figure 14:
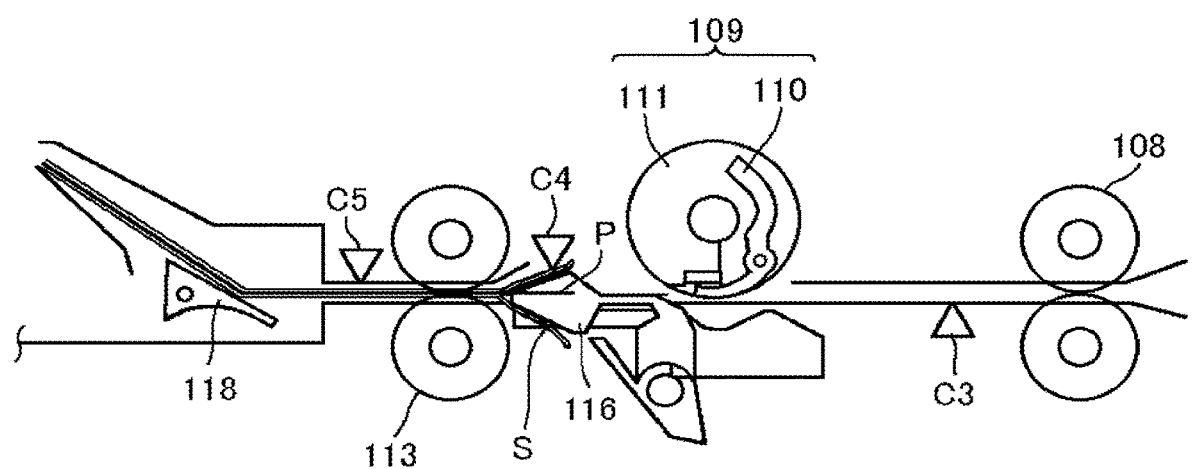
FIG. 14 is a schematic view illustrating the main part of the sheet processing device in a state subsequent to the state in FIG. 13.

Subsequently, as illustrated in FIGS. 13 and 14, the controller 500 of the sheet laminator 200 causes the exit roller pair 113 to rotate so that the lamination sheet S and the inner sheet P meet to insert the inner sheet P into the lamination sheet S from the open portion (on the other end) of the lamination sheet S. This series of operations starting from the conveyance of the inner sheet P is referred to as an "inserting operation".

The lamination sheet S sandwiching the inner sheet P is subsequently subjected to lamination processing (or is not subjected to lamination processing), and is then ejected to the ejection tray 104.

Example 2

Figure 15:
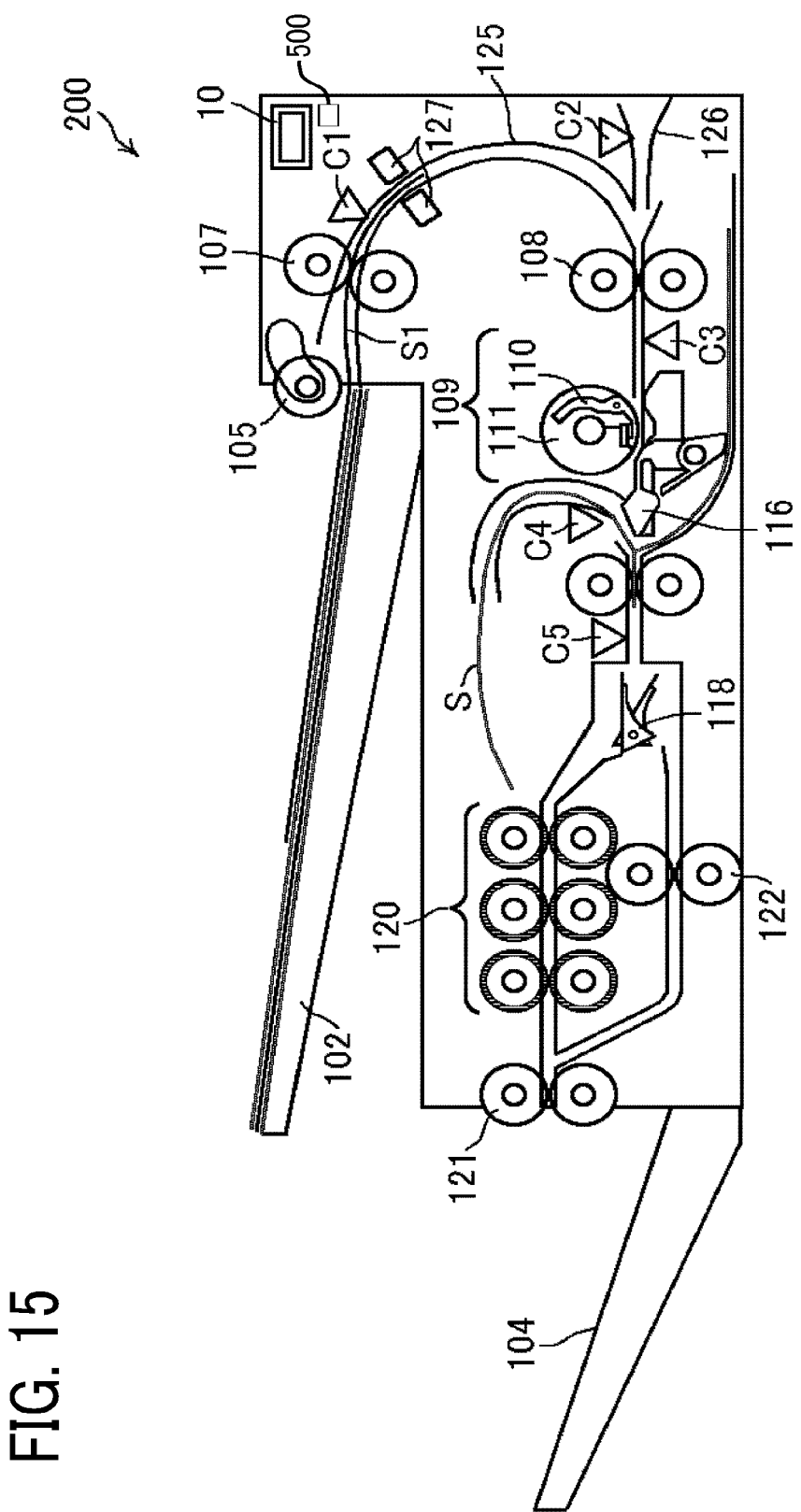
FIG. 15 is a schematic view of a sheet laminator that executes a mixing mode in a state in which a lamination sheet already separated is present in the sheet laminator.

FIG. 15 is also a schematic view of the sheet laminator 200 that executes the mixing mode in a state in which a lamination sheet S already separated is present in the laminator body. As in FIG. 11, lamination sheets S and inner sheets P are loaded on the sheet tray 102, and a lamination sheet S that has already been separated is present on the conveyance path in the laminator body.

Here, it is assumed that a lamination sheet S1 (two-ply sheet) is fed newly (as a first sheet) from the sheet tray 102 when the mixing mode is executed. In such a case, when the sheet type is determined to be a two-ply sheet by the determination sensors 127, the sheet laminator 200 ejects the lamination sheet S in the laminator body and newly separates the lamination sheet S1.

Such a configuration can prevent a plurality of two-ply sheets from being mixed in the sheet laminator 200 and obviate the need for the user to remove the lamination sheet S in the sheet laminator 200, thus preventing occurrence of a downtime.

Alternatively, the pickup roller 105 and the conveyance roller pair 107 may be configured to be rotatable in the forward and reverse directions, and the lamination sheet S1 may be conveyed in the reverse direction and returned to the sheet tray 102. In such a case, the user only needs to remove the lamination sheet S1 from the sheet tray 102, and the operation time can be shortened.

As another alternative, when the sheet type is determined to be a two-ply sheet in execution of the mixed mode, feeding of a new lamination sheet S1 may be stopped to terminate the mixed mode, and an inner sheet P conveyed from the image forming apparatus 300 may be inserted into the lamination sheet S in the sheet laminator 200.

Example 3

Figure 16:
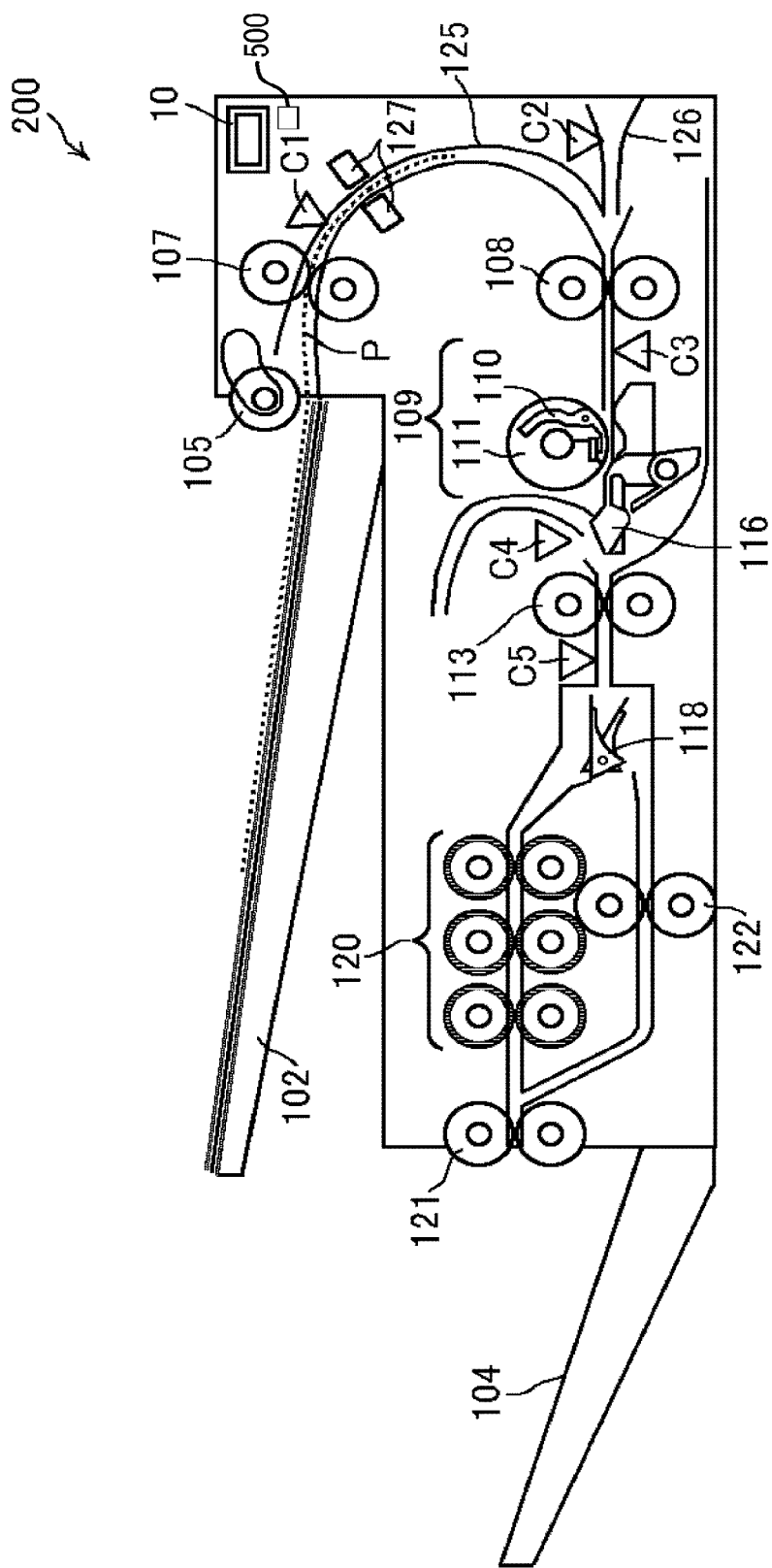
FIG. 16 is a schematic view of a sheet laminator that executes the mixing mode in a state in which a lamination sheet already separated is present in the sheet laminator.

FIG. 16 is a schematic view of the sheet laminator 200 that executes the mixing mode in a state in which a lamination sheet S already separated is present in the sheet laminator 200. FIG. 16 is different from FIGS. 11 and 15 in that the sheet detectors (conveyance sensors C1 to C5) do not detect already-separated portions of the lamination sheet S on the conveyance path of the laminator body (in other words, there is no separated sheet).

Figure 17:
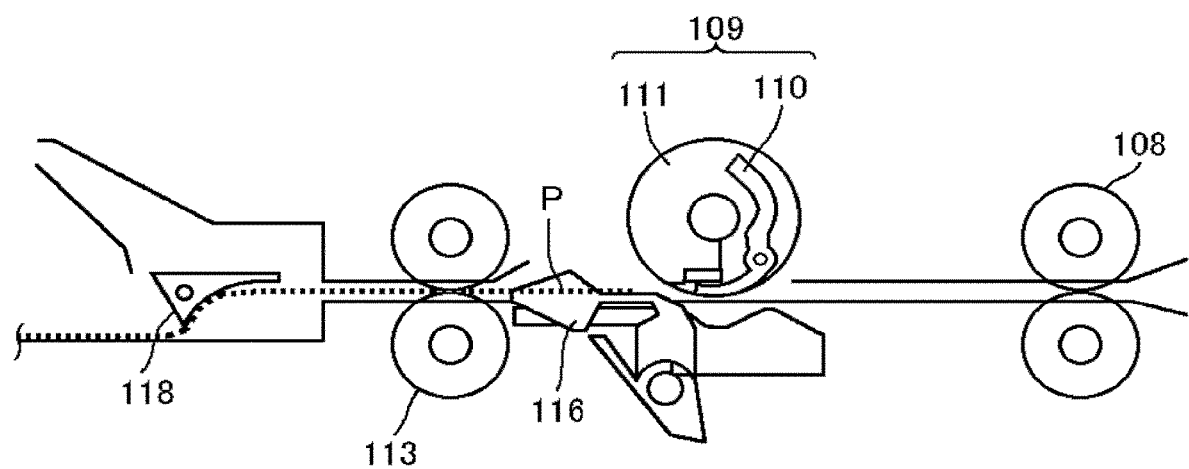
FIG. 17 is a schematic view illustrating the main part of the sheet processing device in a state subsequent to the state in FIG. 14.

Here, it is assumed that an inner sheet P is fed newly (as a first sheet) from the sheet tray 102 when the mixing mode is executed. In such a case, when the sheet type is an inner sheet (sheet medium) by the determination sensors 127, the sheet laminator 200 ejects the inner sheet P as it is (see FIG. 17).

Accordingly, even if an inner sheet P is fed by mistake before the lamination sheet S (two-ply sheet) is separated, the processing is not interrupted, thus preventing occurrence of downtime.

Figure 18:
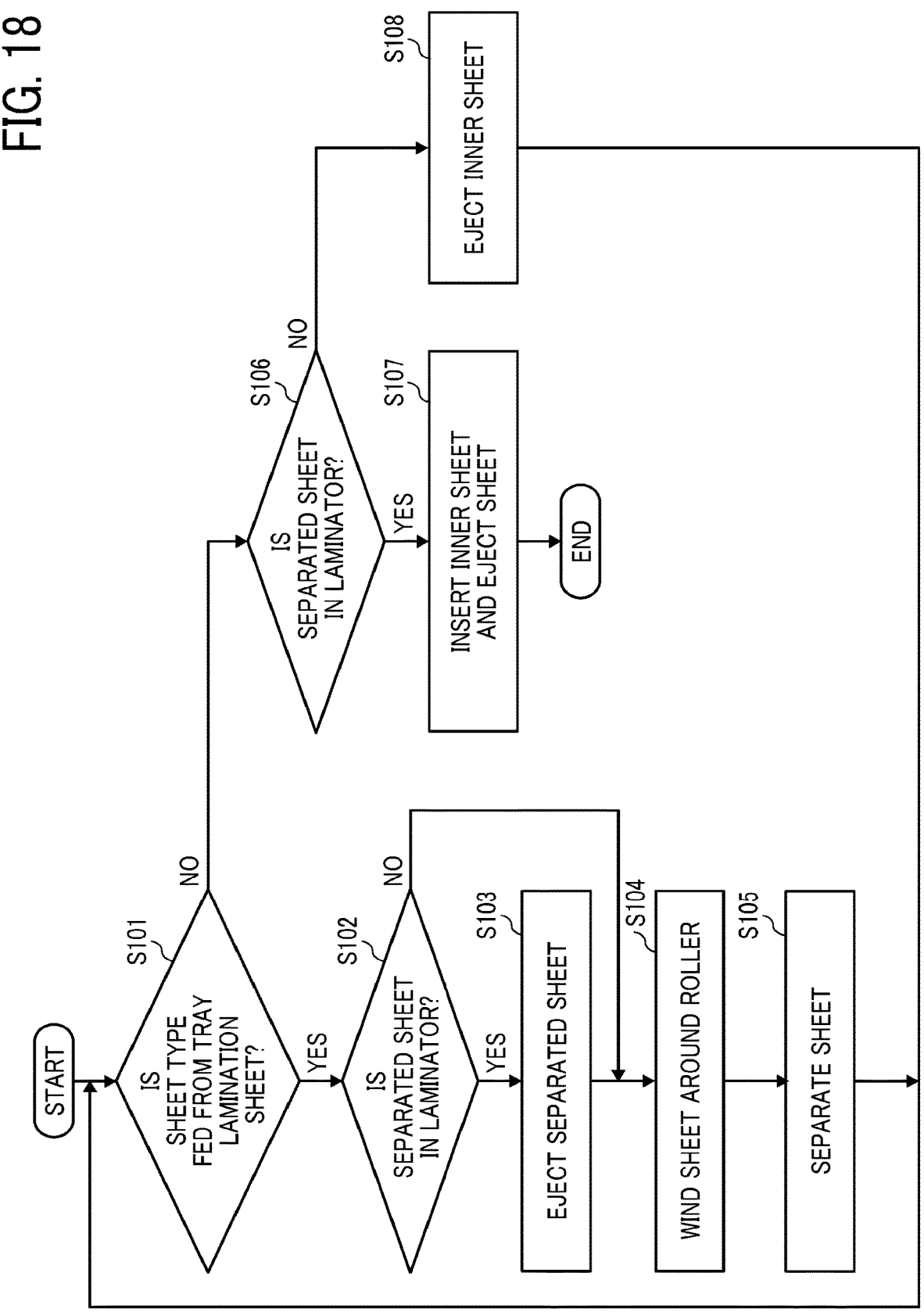
FIG. 18 is a flowchart illustrating a series of steps of lamination processing in the mixing mode.

FIG. 18 is a flowchart illustrating a series of steps of lamination processing in the mixing mode. A description is given below of the series of steps with reference to FIG. 18.

In step S101, the sheet laminator 200 determines the type of a sheet fed from the sheet tray 102 with the determination sensors 127. If the sheet type is a lamination sheet (two-ply sheet S1) (YES in step S101), the process proceeds to step S102.

In step S102, the controller 500 of the sheet laminator 200 determines, with the conveyance sensors C1 to C5, whether a lamination sheet S that has already been separated is present on the conveyance path of the laminator body. When the lamination sheet S is present (YES in step S102), in step S103, the sheet laminator 200 ejects the separated sheet (Example 2; see FIG. 15). Then, the process proceeds to step S104.

When there is no lamination sheet S on the conveyance path of the laminator body in step S102 (NO in step S102), the process also proceeds to step S104.

In step S104, the sheet laminator 200 winds the fed lamination sheet S1 around the winding roller 109 (see FIGS. 5 and 6). In step S105, the sheet laminator 200 separates the entire two sheets of the lamination sheet S1 from each other (see FIG. 9).

After the completion of step S105, the sheet laminator 200 is in a state in which the already-separated sheet S1 is present in the laminator body. Then, the process returns to step S101 again.

In step S101, when the sheet type is a sheet medium (inner sheet P) (NO in step S101), the process proceeds to step S106.

In step S106, the controller 500 of the sheet laminator 200 determines, with the conveyance sensors C1 to C5, whether a lamination sheet S that has already been separated is present on the conveyance path of the laminator body. When the lamination sheet S (or the lamination sheet S1) is present (YES in step S102), in step S107, the controller 500 of the sheet laminator 200 performs the inserting operation and the ejecting operation of the inner sheet P (Example 1; see FIGS. 12 to 14).

Thus, a series of steps of sheet processing (lamination processing) is completed.

When the controller 500 of the sheet laminator 200 determines in step S106 that no lamination sheet S (or a lamination sheet S2) is present on the conveyance path of the laminator body (NO in step S106), the process proceeds to step S108. The sheet laminator 200 ejects the inner sheet P as it is (Example 3; see FIG. 17).

After completion of step S108, the sheet laminator 200 is in a state in which there is no lamination sheet S1 that has already been separated in the laminator body. Then, the process returns to step S101 again to wait for feeding again.

As described above, in the sheet laminator 200 according to the present embodiment, the controller 500 changes the lamination processing (sheet processing) according to the determination result of the sheet determination device and the detection result of the sheet detector when the mixing mode is executed. Accordingly, both types of sheets, in other words, lamination sheets S and inner sheets P can be mixed on the sheet tray 102, and the number of types of insertable inner sheets can be increased. In addition, the need for increasing the size of the sheet laminator can be obviated.

A description is given below of an advantageous configuration of the sheet laminator 200.

When the sheet laminator 200 determines that a first conveyed sheet and a second conveyed sheet are of the same sheet type in the mixed mode, it is desirable to change the lamination processing (sheet processing).

For example, when both the first sheet and the second sheet are two-ply sheets (S1 and S2), the controller 500 stops the conveyance of both two-ply sheets (S1 and S2) as error processing. Such a configuration can prevent the two-ply sheets from being jammed in the sheet laminator 200.

When both the first sheet and the second sheet are two-ply sheets (S1 and S2), the first sheet S1 is separated while the second sheet S2 is reversely conveyed and returned to the sheet tray 102. Such a configuration can prevent the two-ply sheets from being jammed and facilitate the subsequent processing.

A descriptions is given below of a second embodiment of the present disclosure. A sheet laminator according to a second embodiment has a feature in which an operation panel 10 serving as a notification device indicates the type of sheets loaded on a sheet tray 102 to the user and guides the user to perform a correct operation.

Figure 19:
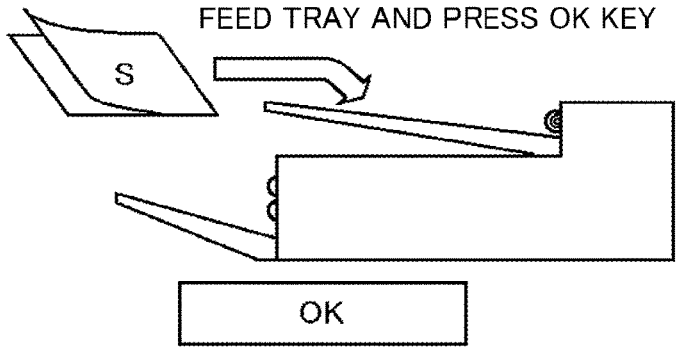
FIG. 19 is an illustration of an example of a screen displayed on an operation panel to prompt loading of a lamination film on a sheet tray.
Figure 20:
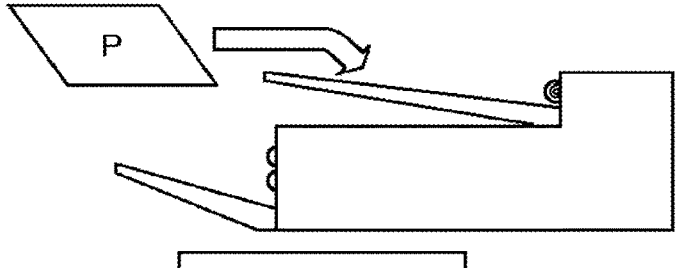
FIG. 20 is an illustration of an example of a screen displayed on an operation panel to prompt loading of an inner sheet on a sheet tray.

FIG. 19 is an example of a screen displayed on the operation panel to prompt loading of a lamination film on the sheet tray. FIG. 20 is an example of a screen displayed on the operation panel to prompt loading of an inner sheet on the sheet tray.

In the mixing mode, a screen as illustrated in FIG. 19 or FIG. 20 is displayed on the operation panel 10 to prompt the user to load a lamination film (two-ply sheet) or an inner sheet (sheet medium). This mode is referred to as a manual lamination mode in that the mode prompts the user to perform work.

When the user loads sheets as instructed on the screen on the sheet tray 102 and touches (presses) an area displayed as "OK", the sheet laminator 200 starts a series of steps of lamination processing.

Figure 21:
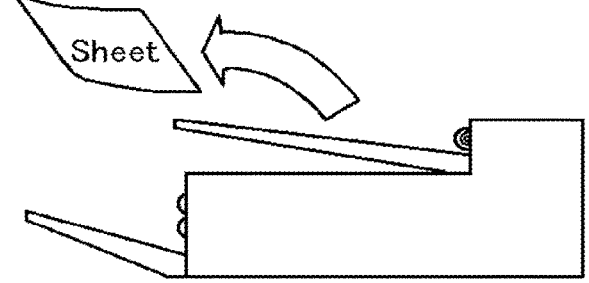
FIG. 21 is an example of an error screen displayed on an operation panel.

However, when the user touches (or presses) an area displayed as "OK" without loading the sheet as instructed on the screen onto the sheet tray 102, an error screen as illustrated in FIG. 21 is displayed on the operation panel 10 to prompt the user to confirm.

The type of the loaded sheets is determined by the determination sensors 127 (see FIGS. 2 and 10) serving as the sheet determination device described above. A dedicated sensor may be separately provided.

Figure 22:
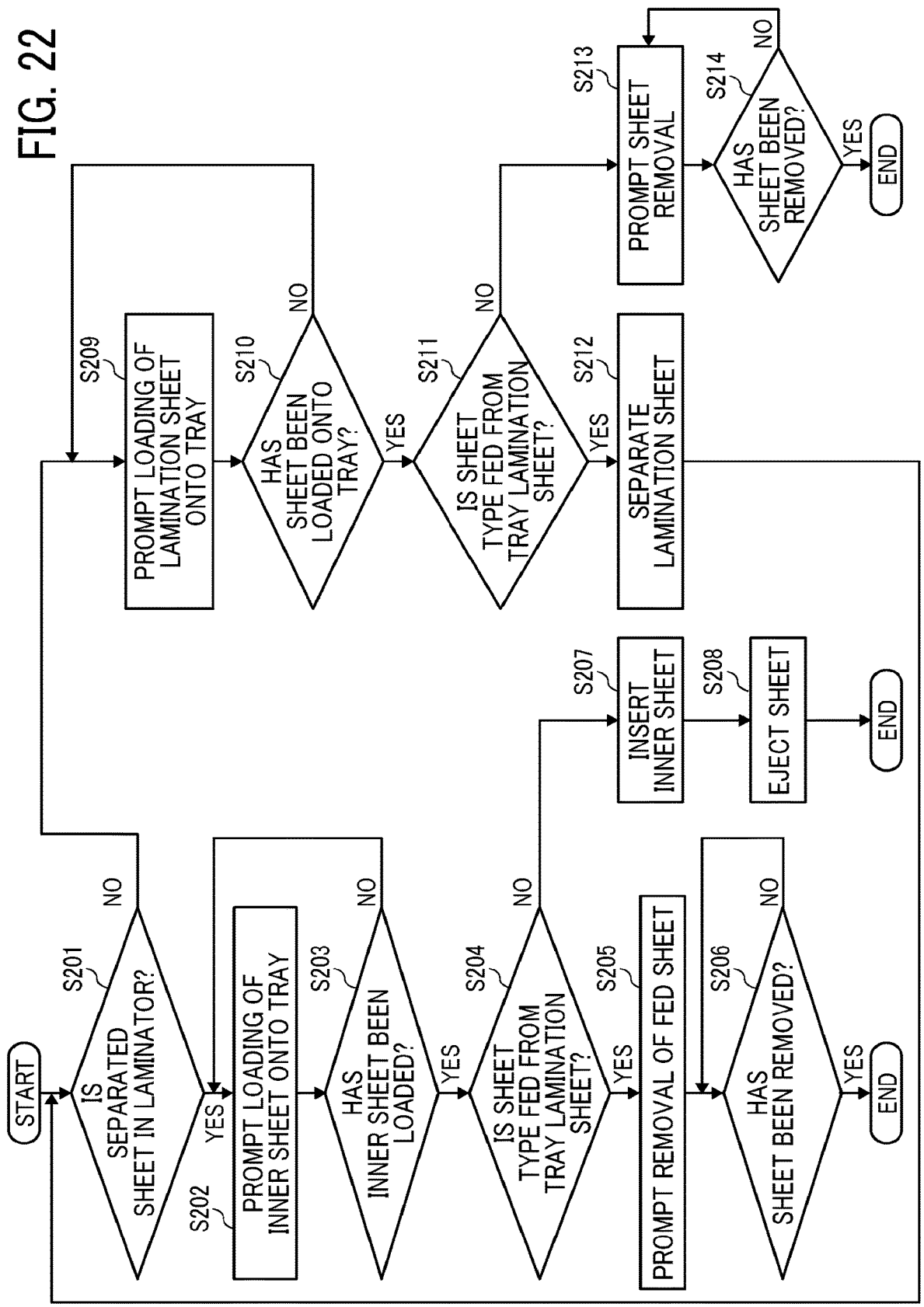
FIG. 22 is a flowchart illustrating a series of steps of lamination processing in a mixing mode.

FIG. 22 is a flowchart illustrating a series of steps of lamination processing in the mixing mode and the manual lamination mode. A description is given below of the series of steps with reference to FIG. 22.

In step S201, the controller 500 of the sheet laminator 200 determines whether a lamination sheet S that has already been separated is present on the conveyance path of the laminator body. When the lamination sheet S is present (YES in step S201), in step S202, the controller 500 of the sheet laminator 200 displays, on the operation panel 10, a screen for prompting loading of inner sheets on the sheet tray 102 (see FIG. 19). In step S203, the controller 500 waits for the user to load an inner sheet P on the sheet tray 102 and instruct the start of the lamination processing.

In step S204, the controller 500 of the sheet laminator 200 determines whether the sheet type is a lamination sheet (two-ply sheet S). When the sheet is a lamination sheet (YES in step S204), the process proceeds to step S205. The controller 500 of the sheet laminator 200 displays an error screen for prompting sheet removal on the operation panel 10 (see FIG. 21). In step S206, the user removes the lamination sheet.

On the other hand, in step S204, when the sheet type is an inner sheet (NO in step S204), the process proceeds to step S207. The sheet laminator 200 performs the inserting operation of the inner sheet. After the operation is completed, the process proceeds to step S208, and the sheet is ejected.

In the previous step S201, if there is no sheet S that has already been separated on the conveyance path of the laminator body, in step S209, the controller 500 of the sheet laminator 200 displays on the operation panel 10 a screen for prompting loading of a lamination sheet on the sheet tray 102 (see FIG. 20). In step S210, the controller 500 waits for the user to load a lamination sheet S on the sheet tray 102 and instruct the start of the lamination processing.

In step S211, the controller 500 of the sheet laminator 200 determines whether the sheet type is a lamination sheet (two-ply sheet S). When the sheet is a lamination sheet (YES in step S211), the process proceeds to step S212. The sheet laminator 200 performs separating operation. Then, the process returns to step S201.

By contrast, in step S211, when the sheet type is an inner sheet (NO in step S211), the process proceeds to step S213. The controller 500 of the sheet laminator 200 displays an error screen for prompting sheet removal on the operation panel 10 (refer to FIG. 21). In step S214, the controller 500 waits for the user to remove the lamination sheet.

As described above, in the sheet laminator 200 according to the present embodiment, the user can load a lamination sheet or an inner sheet as the manual lamination mode when the mixing mode is executed. In such a case, since a message is displayed on the operation panel 10, the user can be guided to the correct operation.

Figure 23:
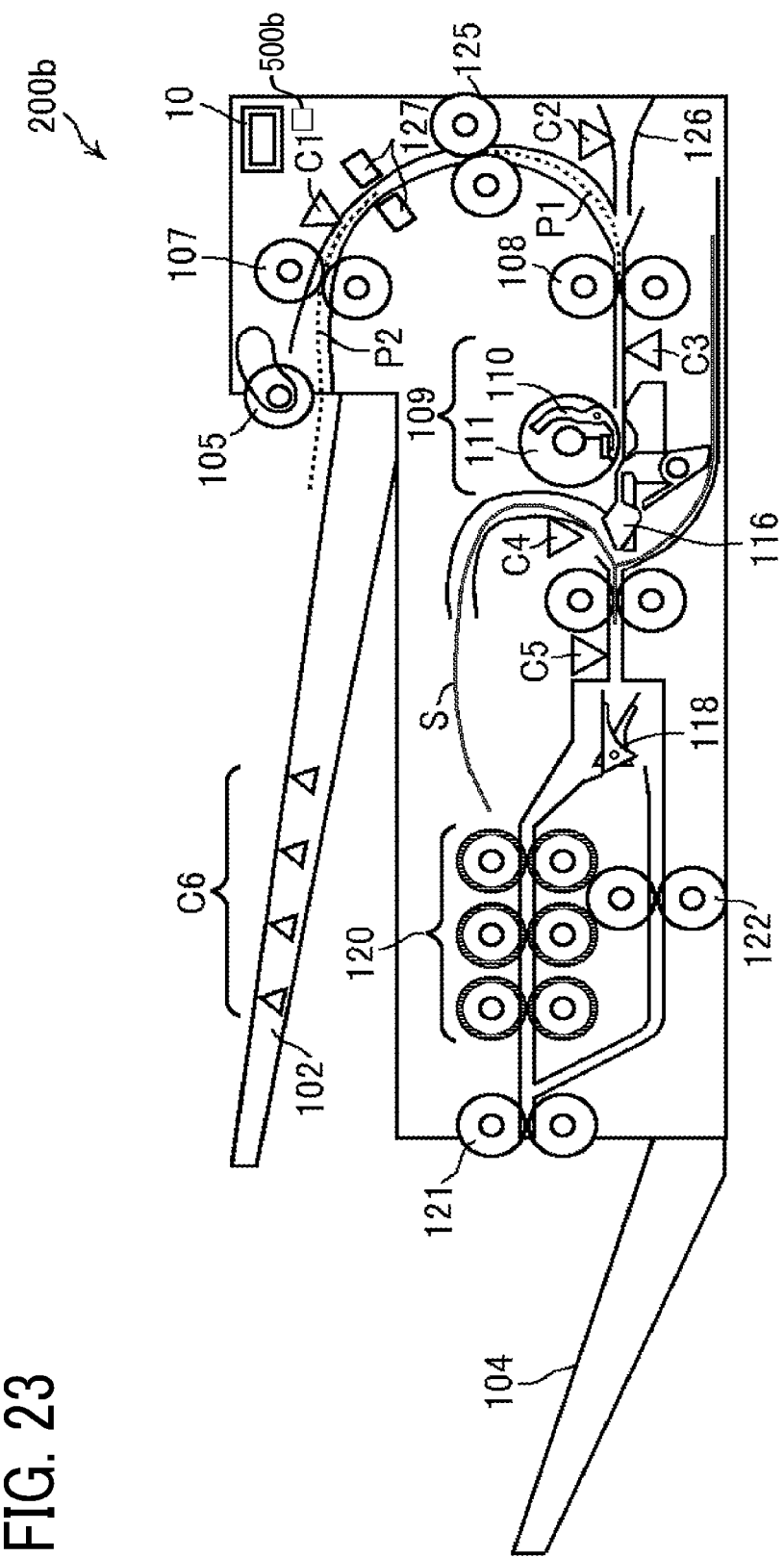
FIG. 23 is a schematic view illustrating an overall configuration of a sheet laminator according to a third embodiment of the present disclosure.

A description is given below of a third embodiment of the present disclosure. FIG. 23 is a schematic view illustrating an overall configuration of a sheet laminator according to an embodiment of the present disclosure. In a sheet laminator 200b according to the present embodiment, the sheet tray 102 is provided with a size sensor C6 that is a size detector to detect the size of the sheet being conveyed (or the length of the conveyed sheet in the conveyance direction).

In other words, the sheet laminator 200b can detect the conveyance direction length Ls of a lamination sheet S and the conveyance direction length Lp of an inner sheet P using the size sensor C6.

In the sheet laminator 200b according to the present embodiment, a size comparator of a main controller 500b that controls the entire operation of the sheet laminator 200b can compare the conveyance direction length Ls of the lamination sheet S and the conveyance direction length Lp of the inner sheet P. The main controller 500b is configured by a computer including, for example, a central processing unit (CPU), a read-only memory (ROM), a random access memory (RAM), and an input/output (I/O). The size comparator is software installed in the computer.

In the mixed mode, when the separated lamination sheet S is present on the conveyance path of the laminator body and the detected conveyance direction length Lp of the inner sheet P falls within the conveyance direction length Ls of the lamination sheet S (Ls>Lp), the sheet laminator 200b performs the inserting operation of the inner sheet P. However, in a case where the inner sheet P does not fall within the lamination sheet S (Ls>Lp), the main controller 500b stops the conveyance of the inner sheet P at that time and performs error processing.

Figure 24:
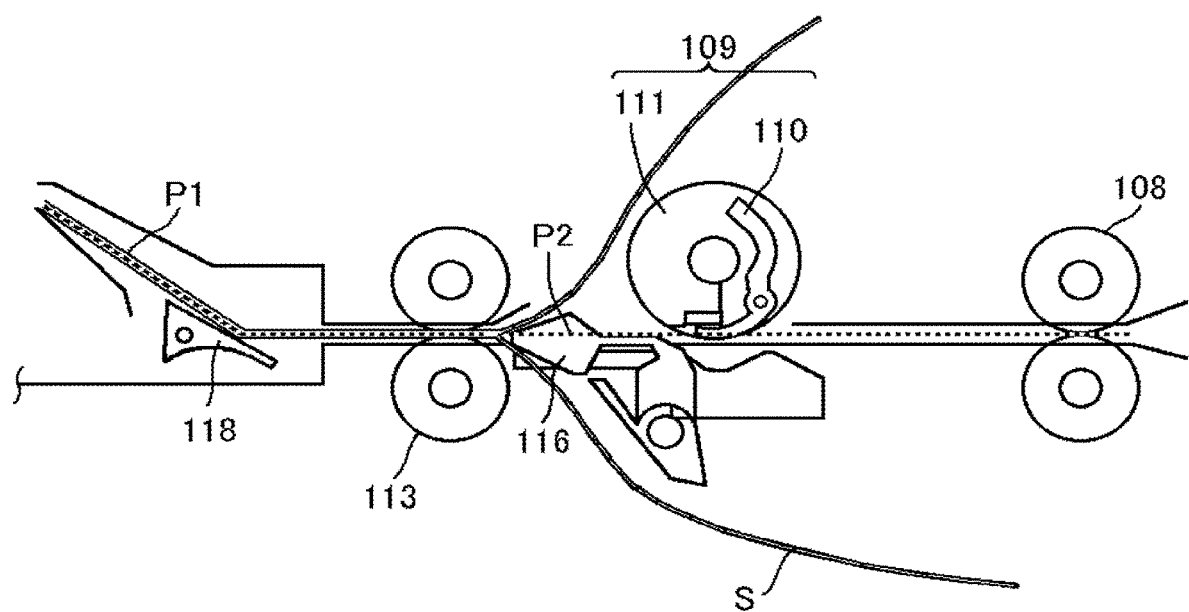
FIG. 24 is a schematic view illustrating the main part of the sheet processing device.

As illustrated in FIG. 24, when a plurality of inner sheets are fed and the sum (P1+P2) of the conveyance direction lengths of inner sheets Lp1 and Lp2 falls within the conveyance direction length Ls of the lamination sheet S (Ls>Lp1+Lp2), the sheet laminator 200 inserts the inner sheets P1 and P2. By contrast, if the inner sheets P1 and P2 do not fall within the lamination sheet S (Ls>Lp1+Lp2), the main controller 500b stops the conveyance of the inner sheets P1 and P2 at that time and performs error processing.

In a case where only the inner sheet P1 has a size that falls within the lamination sheet S (Ls>Lp1), only the inner sheet P1 may be inserted into the lamination sheet S, and the main controller 500b may stop the conveyance of the inner sheet P2 and perform error processing.

An inner sheet(s) (inner sheet P2 or both inner sheets P1 and P2) may be reversely conveyed and returned to the sheet tray 102. In such a case, the user only needs to acquire an inner sheet(s) (inner sheet P2 or both inner sheets P1 and P2) from the sheet tray 102, thus facilitating subsequent processing.

As described above, the sheet laminator 200b according to the present embodiment detects the conveyance direction length of a conveyed sheet by the size sensor C6, and changes the lamination processing (sheet processing) according to the comparison result of the size comparator. Accordingly, a plurality of inner sheets P can be appropriately inserted into the lamination sheet S.

As the size detector, the conveyance sensor C1 can be used to detect the size of the sheet at the detection timing.

Alternatively, an encoder of a motor that rotates the conveyance roller pair 107 may be used. Further, the size sensor C6, the conveyance sensor C1, and the encoder may be used in combination.

Although a sheet laminator has been described as an embodiment, embodiments of the present disclosure are not limited to the above-described sheet laminator. A similar configuration can be applied to a sheet processing device in which the heat pressing roller 120 as a heat pressing member and the ejection roller 121 disposed downstream from the heat pressing roller 120 are removed from the sheet laminator 200. The sheet processing device can perform a separating operation and an inserting operation of an inner sheet as sheet processing.

The image forming apparatus 300 illustrated in FIG. 1 may include a sheet processing device instead of the sheet laminator.

Further, an image forming system according to an embodiment of the present disclosure may include an image forming apparatus 300 and one of a sheet processing device or a sheet laminator 200 detachably attached to the image forming apparatus 300. An image forming system according to another embodiment of the present disclosure may further include, for example, at least one of a sheet feeder (a stacker) or a case binding device.

The image forming apparatus 300 uses an electrophotographic method as a method of forming an image, but is not limited thereto, and may use an image forming method such as an inkjet method or a stencil printing method.

In some embodiments, the operation panel 10 may be provided on the image forming apparatus 300 instead of the exterior of the sheet laminator 200.

Some embodiments of the present disclosure have been described in detail above. Numerous additional modifications to the above-described embodiment and variations are possible. It is therefore to be understood that, within the scope of the appended claims, the disclosure of this patent specification may be practiced otherwise than as specifically described herein. For example, embodiments and advantageous configurations may be combined with each other.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A sheet processing device configured to separate a two-ply sheet in which two sheets are overlapped and partially bonded and sandwich a sheet medium between the two sheets, the sheet processing device comprising:
    a relay conveyance path through which the sheet medium is fed from an image forming apparatus connected upstream of the sheet processing device;
    a sheet loader configured to load at least one of the two-ply sheet and the sheet medium; and
    control circuitry configured to perform a mixing mode to feed the two-ply sheet or the sheet medium from the sheet loader,
    wherein, when the control circuitry determines that a first conveyed sheet from a plurality of sheets is the two-ply sheet and a sheet sensor does not detect the two-ply sheet in a separated state on a conveyance path in the sheet processing device during execution of the mixing mode, the control circuitry is configured to perform sheet processing to separate the first conveyed sheet determined as the two-ply sheet.

2. The sheet processing device according to claim 1, further comprising a sheet determination device configured to determine a sheet type of a conveyed sheet, wherein the control circuitry is configured to change the sheet processing according to a determination result of the sheet determination device.

3. The sheet processing device according to claim 2, wherein the sheet determination device is an ultrasonic sensor configured to determine whether the sheet type is the two-ply sheet or the sheet medium.

4. The sheet processing device according to claim 2, further comprising:
    the sheet sensor configured to detect whether the two-ply sheet in the separated state is present on the conveyance path in the sheet processing device,
    wherein the control circuitry is configured to change the sheet processing according to a detection result of the sheet sensor.

5. The sheet processing device according to claim 4, wherein the control circuitry is configured to change the sheet processing when the control circuitry determines that a first conveyed sheet and a second conveyed sheet are of a same sheet type during execution of the mixing mode.

6. The sheet processing device according to claim 5, wherein the control circuitry is configured to stop conveyance of the first conveyed sheet and the second conveyed sheet when the same sheet type is the two-ply sheet.

7. The sheet processing device according to claim 5, wherein the control circuitry is configured to separate the first conveyed sheet and the second conveyed sheet and return the second conveyed sheet to the sheet loader, when the same sheet type is the two-ply sheet.

8. The sheet processing device according to claim 5, wherein the control circuitry is configured to eject the first conveyed sheet and separate the second conveyed sheet, when the same sheet type is the two-ply sheet.

9. The sheet processing device according to claim 4, further comprising a size sensor configured to detect a length of a sheet fed from the sheet loader in a conveyance direction of the sheet.

10. The sheet processing device according to claim 9, further comprising a conveyor configured to convey the two-ply sheet or the sheet medium,
    wherein the size sensor is an encoder provided for the conveyor.

11. The sheet processing device according to claim 9, wherein the control circuitry is configured to compare a length of the two-ply sheet in the conveyance direction with a length of the sheet medium in the conveyance direction.

12. The sheet processing device according to claim 11, wherein the control circuitry is configured to change the sheet processing according to a comparison result of the length of the two-ply sheet with the length of the sheet medium, when the control circuitry determines that a first conveyed sheet from a plurality of sheets is the sheet medium and the sheet sensor detects the two-ply sheet in the separated state on the conveyance path in the sheet processing device during execution of the mixing mode.

13. The sheet processing device according to claim 12, wherein, when a plurality of sheet media are fed, the control circuitry is configured to calculate, as the length of the sheet medium, a length of a total length of the plurality of sheet media in the conveyance direction.

14. A sheet laminator comprising:
the sheet processing device according to claim 1; and
a heat pressing member configured to heat and press the two-ply sheet.

15. An image forming apparatus comprising:
an image forming device configured to form an image; and
the sheet processing device according to claim 1.

16. An image forming system comprising:
an image forming apparatus; and
the sheet processing device according to claim 1.

17. A sheet processing device configured to separate a two-ply sheet in which two sheets are overlapped and partially bonded and sandwich a sheet medium between the two sheets, the sheet processing device comprising:
a relay conveyance path through which the sheet medium is fed from an image forming apparatus connected upstream of the sheet processing device;
a sheet loader configured to load at least one of the two-ply sheet and the sheet medium; and
control circuitry configured to perform a mixing mode to feed the two-ply sheet or the sheet medium from the sheet loader, wherein when the control circuitry determines that a first conveyed sheet from a plurality of sheets is the sheet medium and a sheet sensor does not detect the two-ply sheet in a separated state on a conveyance path in the sheet processing device during execution of the mixing mode, the control circuitry is configured to perform the sheet processing to eject the first conveyed sheet determined as the sheet medium.

* * * * *